(12) United States Patent
Wehmeier et al.

(10) Patent No.: US 8,892,095 B2
(45) Date of Patent: Nov. 18, 2014

(54) ENABLING ENHANCED PAGING OF STATIONARY TERMINAL DEVICES IN A CELLULAR MOBILE COMMUNICATION NETWORK

(75) Inventors: Lars Wehmeier, Falkensee (DE); Volker Breuer, Boetzow (DE)

(73) Assignee: Gemalto M2M GmbH, Munich (DE)

( * ) Notice: Subject to any disclaimer, the term of this patent is extended or adjusted under 35 U.S.C. 154(b) by 347 days.

(21) Appl. No.: 13/464,768

(22) Filed: May 4, 2012

(65) Prior Publication Data

US 2012/0282925 A1 Nov. 8, 2012

(30) Foreign Application Priority Data

May 6, 2011 (EP) .................................. 11165200

(51) Int. Cl.
*H04W 4/00* (2009.01)
*H04W 36/00* (2009.01)
*H04W 68/02* (2009.01)
*H04W 36/06* (2009.01)
*H04W 36/08* (2009.01)
*H04W 36/32* (2009.01)
*H04W 60/00* (2009.01)

(52) U.S. Cl.
CPC .......... *H04W 36/0083* (2013.01); *H04W 68/02* (2013.01); *H04W 36/06* (2013.01); *H04W 36/08* (2013.01); *H04W 36/32* (2013.01); *H04W 60/00* (2013.01)
USPC ........................................ 455/434; 455/432.2

(58) Field of Classification Search
USPC ............. 455/434, 432.1, 426.1, 435.1–435.3, 455/436–448
See application file for complete search history.

(56) References Cited

U.S. PATENT DOCUMENTS 7,492,740 B2 * 2/2009 Sipila et al. .................... 370/335
8,320,918 B2 * 11/2012 Lee et al. ....................... 455/441
2008/0102835 A1 5/2008 Zhao et al.
(Continued)

FOREIGN PATENT DOCUMENTS

EP 0812119 A2 12/1997
EP 1 146 756 A1 10/2001
(Continued)

OTHER PUBLICATIONS

B.P. Crow, et al; "IEEE 802.11 Wireless Local Area Networks;" IEEE Communications Magazine; vol. 35, No. 9; Sep. 1, 1997; pp. 116-126.

*Primary Examiner* — Brandon Miller
(74) *Attorney, Agent, or Firm* — Ware, Fressola, Maguire & Barber LLP

(57) ABSTRACT

To distinguish between stationary and free-to-move terminal devices in a mobile communication network in order to reduce paging interference, a stationary terminal device chooses a surrounding radio cell as a home cell, which remains associated to the stationary terminal device, as long as the home cell fulfills a suitable-cell-requirement. Therefore, the communication network can be operated such that a paging request is only distributed through one base station/ NodeB, if that paging request is to be forwarded to a stationary terminal device being associated to a home cell. According to another aspect of the present invention, stationary terminal devices are grouped in separate paging group that is stored in an operation unit of the mobile communication network. If a paging request is to be distributed, it is firstly checked, whether the paging request is to be forwarded to one of the terminal devices of the separate paging group.

8 Claims, 3 Drawing Sheets

(56) References Cited

U.S. PATENT DOCUMENTS

Figure 1:
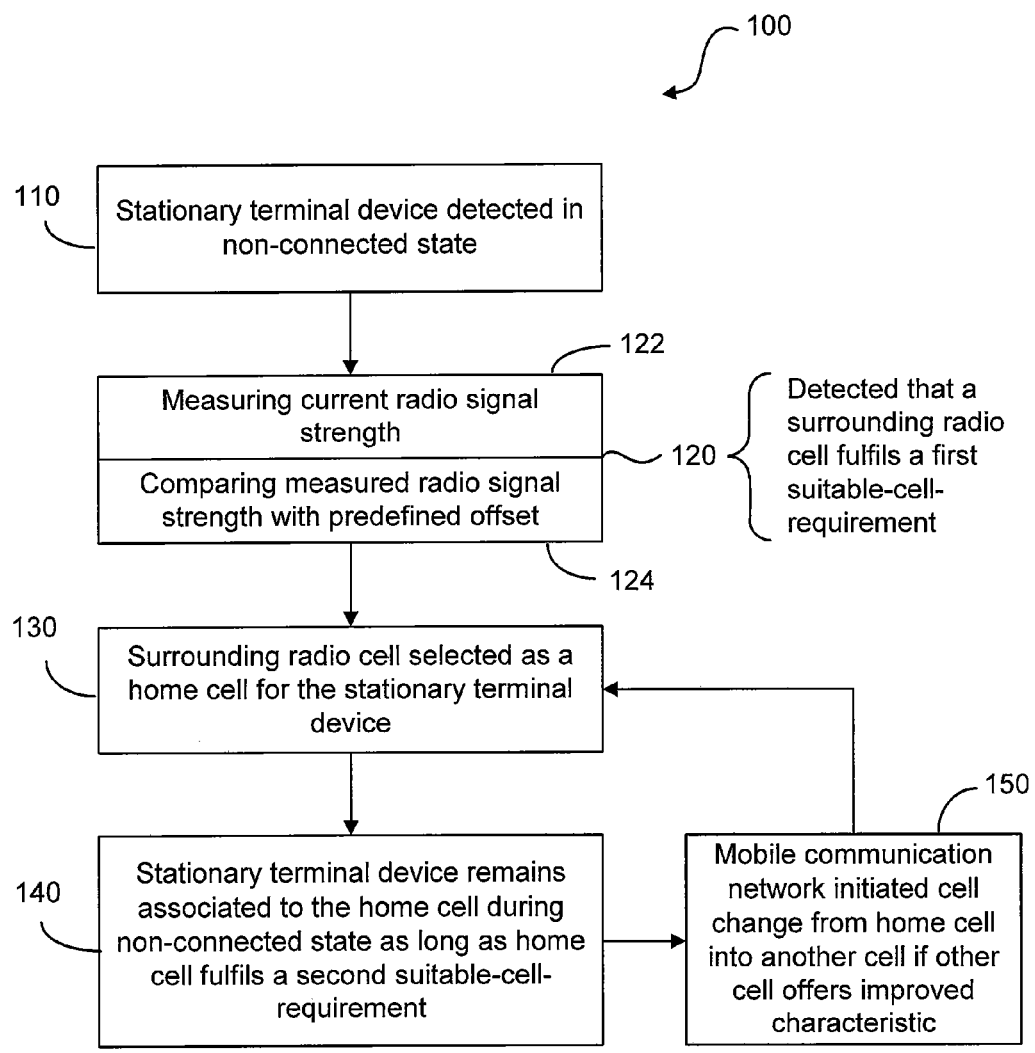

| | | |
|---|---|---|
| 2008/0108353 A1* | 5/2008 | Lee et al. .................... 455/437 |
| 2008/0119209 A1 | 5/2008 | Upp |
| 2010/0029274 A1 | 2/2010 | Deshpande et al. |
| 2010/0240368 A1 | 9/2010 | Fox et al. |
| 2011/0319080 A1* | 12/2011 | Bienas et al. ................ 455/436 |
| 2013/0273904 A1* | 10/2013 | Wehmeier et al. ........... 455/423 |

FOREIGN PATENT DOCUMENTS

| | | |
|---|---|---|
| EP | 1 643 791 A1 | 4/2006 |
| EP | 2 239 988 A2 | 10/2010 |
| GB | 2 428 164 A | 1/2007 |
| WO | 95/11577 A1 | 4/1995 |
| WO | WO 00/13377 | 3/2000 |
| WO | 2008/146868 A1 | 12/2008 |
| WO | 2010/049756 A2 | 5/2010 |

\* cited by examiner

ENABLING ENHANCED PAGING OF STATIONARY TERMINAL DEVICES IN A CELLULAR MOBILE COMMUNICATION NETWORK

The present invention relates to a method of operating a terminal device, a terminal device, a method of paging a stationary terminal device, a method of operating core network node of a mobile communication network and to corresponding computer programs.

While in the following explanations are given with by way of example with reference to certain current mobile telecommunication standards such as GSM, UMTS or LTE, the present invention is not restricted in its applicability to a particular standard for cellular mobile communication networks.

Cellular mobile communication networks, such as a UMTS-Network, comprise a core network, which comprises core network nodes for switching, signalization and relaying, and a radio access network, such as the so-called UMTS terrestrial radio access network (UTRAN). A radio access network comprises several radio network controllers (RNC). Each RNC controls a radio access network subsystem (RNS). A RNS is a geographical area, which is controlled by a certain RNC. One or more base stations (NodeB) are coupled to a single RNC and operate one or more radio cells in the RNS.

A terminal device, in the following for brevity also referred to as a UE, for example a mobile terminal, a computer, a mobile telephone or a radio communication module (MT) used in machine to machine communication, builds up a radio connection to a base station operating a radio cell in which the UE is located. A UE is always associated to a single radio cell. For facilitating administration of the network, for instance for facilitating relaying a call to the correct radio cell, a RNS is divided into one or more so-called location areas (LA). Each LA comprises one or more radio cells, wherein the spatial extension of radio cells may partially overlap. A UE can thus be physically located in two or more radio cells, however, in operation it is only connected/associated to one of them. As long as the terminal device does not leave its location area, no location update in the visitor location register (VLR) of the core network has to be performed.

For relaying a call to a a terminal device that camps on a radio cell of a UMTS network, it has usually been proceeded as follows: A mobile terminal, which has registered itself with the network, is assigned to a so-called paging group (PG). Within the paging group, the mobile terminal listens to the so-called paging indicator (PI), which is transmitted over a paging indication channel. If the mobile terminal detects a paging indicator, it decodes a subsequent paging channel (PCH) frame for gathering the respective information. According to prior art, the paging indicator is transmitted to all mobile terminals of the paging group, if a paging request is to be forwarded to single of the mobile terminals of the group.

The publication WO 00/13377 describes that a mobile terminal chooses a radio cell in dependence of a signal strength. The mobile terminal chooses the radio cell that offers best radio conditions. The mobile terminal then camps on the chosen radio cell, until it is called by the radio access network controller or, respectively, if it is to initiate a call. During camping, the mobile terminal is in a non-connected mode, for instance in the CELL_PCH, or URA_PCH state or in an IDLE mode. For delivering a call to a mobile terminal being in a non-connected mode, a paging method is used.

As during the time of the incoming call, it is not known, in which radio cell the called mobile terminal is to be found (as it changes the radio cell, whenever another radio cell is found that offers better radio conditions), the paging is performed such that all mobile terminals that are part of the called mobile terminal's paging group can receive the paging indicator. For doing so, the core network sends a radio access network application part- (RANAP-) paging request to radio access network controllers. In response, the radio access network controllers send a "paging type 1" message to the cells being associated to RNCs via the base stations (NodeBs). The mobile terminals that are situated in radio cells that are operated by these RNCs receive this "paging type 1" message and each send information about the so called Non-Access-Stratum to the core network.

According to a first aspect of the present invention a method (100) for operating a stationary terminal device in a cellular mobile communication network that has a plurality of radio access network cells is provided. The method (100) comprises:

the terminal device detecting (110) that it is being or is about to be operated in a non-connected state, the terminal device detecting whether or not at least one radio access network cell of a mobile communication network (300) fulfils a first suitable-cell-requirement, the terminal device selecting one of those radio access network cells that fulfil a first suitable-cell-requirement as a home cell for operation of the terminal device as a stationary terminal device in the non-connected state and associating the terminal device to the home cell while operated as stationary terminal device by signal exchange with a base station allocated to the home cell, the terminal device subsequently detecting whether or not the selected home cell fulfils a second suitable-cell-requirement that in comparison with the first suitable-cell-requirement is biased in favour of the terminal device remaining associated with the selected home cell and against selecting another radio access network cell as the new home cell; and the terminal device not initiating a change from the selected home cell to another radio access network cell as a new home cell during the non-connected state for as long as during the non-connected state the selected home cell fulfils the second suitable-cell requirement.

The present invention includes the recognition that according to the prior art, each terminal device/mobile radio terminal device has to decode a subsequent PCH frame upon receiving a paging indicator, even though the present paging request may not have relevant information for the respective terminal device/mobile radio terminal device. In the outcome, many terminal devices perform unnecessary decoding operations. Also, as UEs of a paging group can be distributed over the entire communication network and as a paging request is transmitted such that all UEs of the paging group can receive it, that is to say: within a potentially very large geographical area, a paging request can therefore cause a comparatively large interference.

On the other hand, the present invention has recognized that the area in which a paging request has to be distributed (paging area) can be significantly reduced, if the location of the respective terminal device in the mobile communication network is known to be fixed. The paging area can be decreased in dependence of the accuracy of the position of the UE/MT. The signalling amount can be reduced.

Based on these recognitions and in contrast to the method of selecting a radio cell for a terminal device according to the prior art, namely contrast to a dependence on the best radio signal strength, it is now suggested that a stationary UE remains associated with the once associated home cell during the non-connected state, even if the home cell does not perfectly fulfil the (first) suitable-cell-requirement. To this end, a second suitable-cell-requirement is used that in comparison with the first suitable-cell-requirement is biased in favour of the terminal device remaining associated with the selected home cell and against selecting another radio access network cell as the new home cell. Therefore, even if another surrounding radio cell would offer an improved radio signal strength in comparison with the home cell, the stationary terminal device remains associated to the selected home cell.

Thus, according to the operating method of the present invention, it is not required to check whether another surrounding radio cell of the stationary UE offers improved radio signal strength, but rather only whether the current home cell fulfils the second suitable-cell-requirement. As long as the second suitable-cell-requirement is fulfilled by the home cell, the stationary terminal device remains associated to that home cell.

Thus, the position of the stationary terminal device is known within the smallest possible paging area (one radio cell), in particular irrespectively of its actual radio resource control (RRC) state.

This in turn only allows to conceive the new paging concept of the present invention, according to which a paging request that is to be forwarded to a stationary terminal device being associated to a home cell must not be distributed through an entire core network with one or more UTRANs, but only within a location area that includes the respective home cell. Therefore, an interference caused by distributing a paging request within a mobile communication network can be significantly reduced.

The home cell belongs to a single location area, only. Thus, the paging area can be reduced to that single location area. This results in a reduction of the entire network load caused by an upcoming paging request: There are fewer BNCs involved in distributing a paging request, there are fewer location updates to be registered, there are fewer UEs/mobile terminals that have to decode a PCH frame. Therefore, both on the BNC side and on the terminal side, energy consumption is reduced.

The terminal device can be any mobile radio terminal device or mobile radio module that may be operated as a stationary terminal device, for instance a radio communication module for use in machine-to-machine communication such as in a vending machine, any kind of controlling device, a home appliance device, an industrial controlling device, which receives and transmits data via a GSM/UMTS/LTE or other cellular mobile communication network.

The non-connected state of the stationary terminal device can be, for instance, an IDLE mode, the cell_PCH state or the URA_PCH state.

The first and second suitable-cell-requirement can be any requirement related to a measurable quantity that is indicative the quality of reception via the air interface.

However, it shall be emphasized that according to the method of the first aspect of the present invention, it is not checked, whether another surrounding radio cell offers a better radio signal strength than the current home cell, but rather continuously monitored if the home cell fulfils the second suitable-cell-requirement. Association of the stationary terminal device to the current home cell is ensured, as long as the second suitable-cell-requirement is fulfilled by the home cell. During a connected mode of the stationary terminal device, after the stationary terminal device has been paged, the stationary terminal device can choose another surrounding radio cell that offers improved radio signal strength.

In the following, some examples of carrying out the method of the first aspect of the present invention are described. Additional steps or more concise steps that are described can be combined with each other to form further embodiments of the method of the first aspect of the present invention, as long as they are not described as being alternative to each other.

In the following, standard abbreviations, wordings and terms that are commonly used for describing second generation (2G) or third generation (3G) systems are also used for describing the present invention. It shall be understood, however, that the wordings used in the present description and in the claims shall not be construed in a sense that would reduce the applicability of the present invention to a certain mobile communication standard. For instance, the term "terminal device" is used for describing the mobile radio terminal device that is adapted to participate in a mobile communication network. Such mobile communication network can be a 2G or 3G or any other mobile communication network. The same applies, for instance, to the wording "base station" introduced further below. The applicability of the present invention is not only reduced to devices forming or participating in a wide-area-mobile communication network, such as GSM or UMTS, but can also be applied in local mobile communication network like PICOCELL, WLAN, WiFi or similar networks.

In a preferred embodiment, the second suitable-cell-requirement differs from the first suitable-cell-requirement by a predefined offset applicable to a threshold value of the measurable quantity used for determining the signal quality via the air interface, so as to achieve the biasing towards remaining with the currently selected home cell. For instance, the detecting performed in this context involves Measuring a current radio signal strength provided by the home cell, Comparing the measured radio signal strength with the predefined threshold value and Remaining associated to the home cell, as long as the measured radio signal strength is above the predefined threshold.

In this example, the threshold value used for the second suitable-cell-requirement is lower than that used for the first suitable-cell-requirement.

The predefined offset used for the threshold value can be stored in the stationary terminal device.

In the non-connected state, the stationary terminal device is associated to the home cell. In other modes/states, in particular in the connected mode, the stationary terminal device may change the associated cell from the home cell to another surrounding radio cell. For instance, after the stationary terminal device has been paged and informed about an incoming call, the terminal device can choose another surrounding radio cell that offers improved radio signal strength and stay in that cell during the call, that is: during data transfer. In a preferred embodiment, the method of the first aspect of the present invention comprises:

the terminal changing to a connected state the terminal performing a change of association from the previously selected home cell to a radio access network cell different from the home cell by signal exchange with another base station allocated to the different radio access network cell;

the terminal returning to the non-connected state the terminal device subsequently initiating a process of re-associating the terminal device back to the previously selected home cell.

According to this embodiment, the stationary terminal device is to perform a cell re-selection for returning into the home cell in the non-connected state, after the network has initiated a cell change, for instance into one of state Cell_D-SCH or Cell_FACH.

To facilitate the re-selection, according to a further preferred embodiment, the method additionally comprises a step of storing an identifier of the last selected home cell in the stationary terminal device before initiating a change of association, in particular through an AT command, also known as Hayes command.

In one embodiment the method additionally comprises a step of transmitting the identifier of the home cell to an operator of the mobile communication network. When sending a paging request, the operator can therefore check whether the received paging request is to be forwarded to a stationary terminal device being associated to a home cell and reduce distribution of the paging request to at least the location area, to which the home cell of the stationary terminal device to be paged belongs. Therefore, the interference caused by the paging is furthermore reduced and the number of decoding attempts of other terminal device located in other cells that do not belong to the aforementioned location area is also reduced. However, the transmission may also be performed by a node of the radio access network.

As signal quality or the global set-up of the radio access network can change over time, the method preferentially comprises the additional step of:

Selecting another radio cell as home cell, if the originally chosen home cell does not fulfil the second suitable-cell-requirement anymore.

According to a second aspect of the present invention, terminal device (200) for communication via a radio access network cell of a cellular mobile communication network is provided, the terminal device comprising:

a device parameter unit for storing a device parameter allocated to the terminal device and having one of exactly two possible device parameter values indicative of whether or not the terminal device is being operated either as a stationary terminal device or as a non-stationary terminal device, a state detector (210) adapted to detect that the terminal device is operated in a non-connected state, a radio cell detector (220) adapted to detect whether or not at least one radio access network cell of a cellular mobile communication network (300) fulfils a first suitable-cell-requirement, a cell selector (230), which is connected with the radio cell detector and which is configured to select one radio access network cell that fulfils the first suitable-cell-requirement as a home cell for operation as a stationary terminal device (200) in the non-connected state and to initiate a signal exchange of the terminal device with a base station allocated to the home cell for association of the terminal device (200) to the home cell while operated as stationary terminal device, wherein the cell selector is configured to ascertain whether the selected home cell fulfils a second suitable-cell-requirement that in comparison with the first suitable-cell-requirement is biased in favour of the terminal device remaining associated with the selected home cell and against selecting another radio access network cell as the new home cell and to not initiate a change of the association the terminal device away from the selected home cell to another radio access network cell as a new home cell for as long as the selected home cell fulfils the second suitable-cell-requirement.

The terminal device of the second aspect of the present invention shares the advantages of the operating method of the first aspect of the present invention. In particular, the terminal device has preferred embodiments that correspond to embodiments of the operating method described above. For instance, in a preferred embodiment, the terminal device comprises a memory adapted to store an identifier of the home cell and a transmitter unit adapted to transmit the stored identifier of the home cell to an operator of the mobile communication network. It is also preferred that the terminal device comprises a measuring unit adapted to measure a current radio signal strength provided by a surrounding cell, in particular provided by the home cell, a comparator adapted to compare the measured radio signal strength with a predefined offset, the predefined offset forming the suitable-cell-requirement, and it is preferred that the cell association unit is adapted to ensure that the stationary terminal device remains associated to the home cell during the non-connected state, as long as the measured radio signal strength is above the predefined offset.

It should be noted that the terminal device need not permanently be operated as a stationary terminal device. A change of the mode of operation in this sense is accompanied by a change of the device parameter value indicating whether or not the terminal device is stationary or not.

In one embodiment, the terminal device is configured to periodically perform a paging detection for a reception of a paging request directed to the terminal device from the base station of the home cell. A first time period between two consecutive paging detections is longer than a second time interval between periodic paging detections, which are performed by any non-stationary terminal device associated with the same radio access network cell that is forming the home cell for the stationary terminal device.

A method (300) for operating a core network node of a cellular mobile communication network, the method comprising:

initiating (310) a paging request that is to be directed to a stationary terminal device;

querying a first data base for ascertaining a home cell to which the stationary terminal device is currently associated, the first data base uniquely allocating respective home cells, to which stationary terminal devices are associated during operation in their non-connected state, to stationary terminal devices registered with the communication network, querying a second data base, which uniquely allocates groups of radio access network cells to respective location areas, to ascertain that location area, to which the ascertained home cell is allocated, distributing (320) the paging request only within the ascertained location area, to which the ascertained home cell belongs.

According to the paging method of the third aspect of the present invention, the interference caused by the paging and the number of the decoding attempts of UEs is significantly reduced, as in all remaining radio cells that are not part of the location area and/or, respectively, of the UTRAN registration area, to which the home cell belongs, the paging request is not distributed. Therefore, UEs which are associated to such remaining radio cells do not receive a paging indicator and therefore do not have to decode a PCH frame. Therefore, the consumption of electricity of such UEs is reduced and there is no interference in these remaining radio cells. Thus, globally regarded, the interference caused by a paging request is significantly reduced as only a small selected number of radio cells a) are provided with the paging request and b) electricity consumption is reduced on the side of the UEs that do not receive a respective paging indicator and on the side of the base stations, as usually only one base station has to be used for distributing the paging request and the remaining base stations of the network are not involved in distributing.

In a preferred embodiment of the method, the paging request is distributed through one base station only, to which the home cell is associated.

Preferably, the method comprises instructing any base station, to which the paging request is distributed, to broadcast the paging request via a defined paging channel that is allocated to a predefined paging group, which, in addition the stationary terminal device to be paged, comprises only stationary terminal devices associated with the ascertained home cell.

As the home cell is only linked to one UTRAN registration area or to one location area, paging is performed only in such an area, irrespectively of the RRC connected state of the stationary terminal device. As the stationary terminal device can be located between different URA/LA cells, it is preferred that the paging request is distributed in both the URA and LA.

A fourth aspect of the invention is a method (400) for operating a core network node of a cellular mobile communication network having a plurality of radio access network cells, the method (400) comprising:

receiving (410) terminal device identifiers, which are suitable for identifying respective terminal devices, and terminal device parameters, which are uniquely allocated to respective terminal device identifiers, for terminal devices registered with the communication network, wherein the received terminal device parameters have a respective one of exactly two possible device parameter values indicative of whether the terminal device is being operated either as a stationary terminal device or as a non-stationary terminal device, uniquely allocating terminal device identifiers to a number of paging groups (420), wherein the assigning to paging groups comprises assigning terminal device identifiers of terminal devices being operated as a stationary terminal device to different respective paging groups than terminal devices being operated as non-stationary terminal devices.

detecting (430) that a paging request is to be forwarded to a stationary terminal device of the separate paging group and forwarding (440) the paging request only through such base stations of the communication network, which operate radio cells being associated to the stationary terminal devices of the separate paging group.

The fourth aspect of the present invention includes the recognition that the network situation of stationary terminal devices does not regularly change and that this information can be advantageously used for reducing the paging interference:

According to the method of the fourth aspect of the present invention, stationary terminal devices are listed in separate paging group. Upon receiving a paging request that is to be forwarded to one of a terminal device of that separate paging group, that paging request is only forwarded through such base stations of the mobile communication network, which operate radio cells being associated to the stationary terminal devices of the separate paging group. Remaining base stations of the mobile communication network do not participate in distributing the paging request and therefore, terminal devices that are situated in radio cells that are operated by such remaining base stations are not disturbed by an incoming paging request that is not relevant for them. Therefore, the number of PCH frames to be decoded caused by the paging request is reduced.

Generally spoken, on the one hand, the method of the fourth aspect of the present invention reduces the interference caused by a paging request that is to be forwarded to a stationary terminal device and, on the other hand, electricity consumption is reduced both on the side of terminal devices and on the side of base stations. As there are, globally regarded, less Paging Indicators per UE, the checking rate for checking whether a PI is present or not of each UE can be reduced.

Preferentially, the respective terminal device identifier is an international mobile subscriber identifier (IMSI).

Receiving the terminal device parameters comprises querying a database, which is external to the core network node and is in particular a Home Location Register. In other words, the step of receiving respective terminal device parameter data preferentially comprises accessing a Home Location register (HLR). As the IMSI, which is assigned to each terminal device, is known on the HLR level and as the terminal devices publish their stationary characteristic in terms of the terminal device parameter data, stationary terminal devices can be gathered in the separate paging group on a Serving GPRS Support Node level (SGSN-level). The step of grouping therefore preferentially comprises storing the paging group on a Serving GPRS Support Node level.

In the outcome, all participating terminal devices of the mobile communication network are, globally regarded, less frequently paged. Therefore, all terminal devices change less frequently from so-called sleep mode/non-connected mode into a mode for decoding a PCH frame. Thus, globally regarded, the consumption of electricity is reduced in the entire network, both on the side of terminal devices and on the side of base stations.

Yet another aspect of the present invention is directed to a first computer program for operating a stationary terminal device, wherein the first computer program comprises program code means for causing their stationary terminal device of the second aspect of the present invention to carry out the steps of the method of the first aspect of the invention, when the first computer program is run on a computer controlling the stationary terminal device.

The present invention is furthermore directed to yet another aspect, namely to a second computer program for operating a mobile communication network, wherein the second computer program comprises program code means for causing the mobile communication network to carry out the steps of the method according to the third or the fourth aspect of the present invention, when the second computer program is run on a computer controlling the mobile communication network.

These and other aspects of the invention will be apparent from and elucidated with reference to the embodiments described hereinafter.

Figure 2:
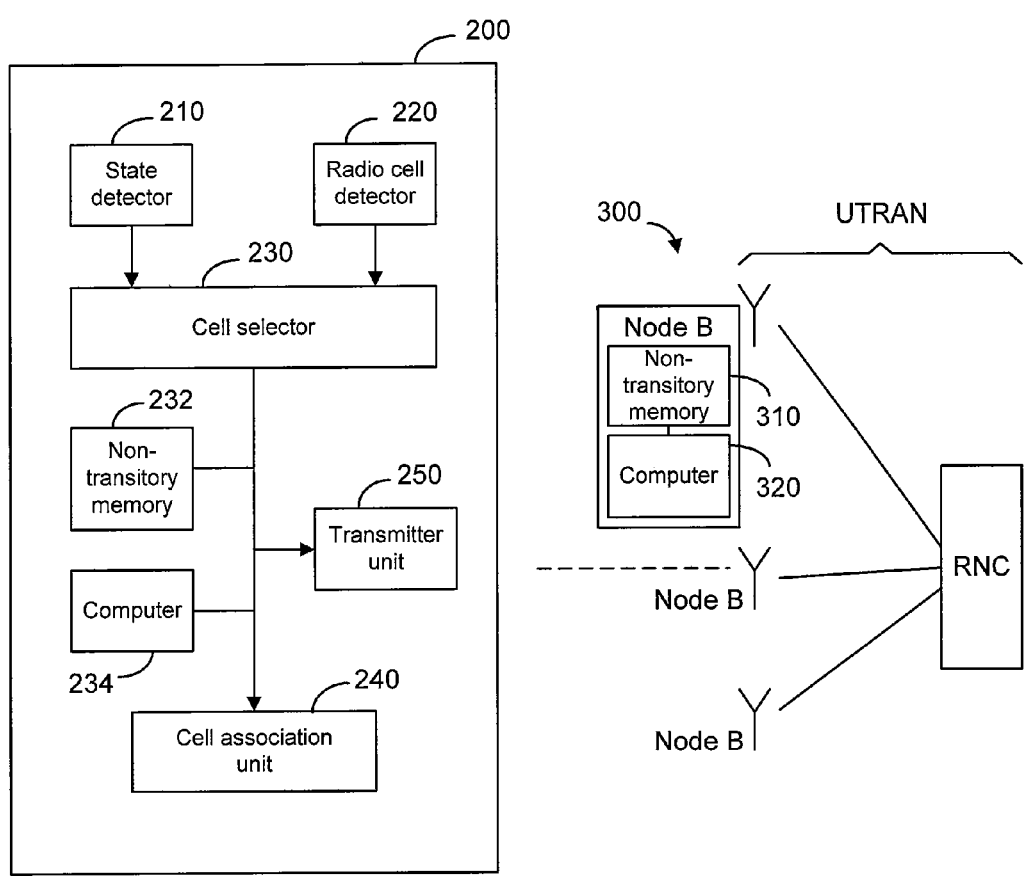
Figure 3:
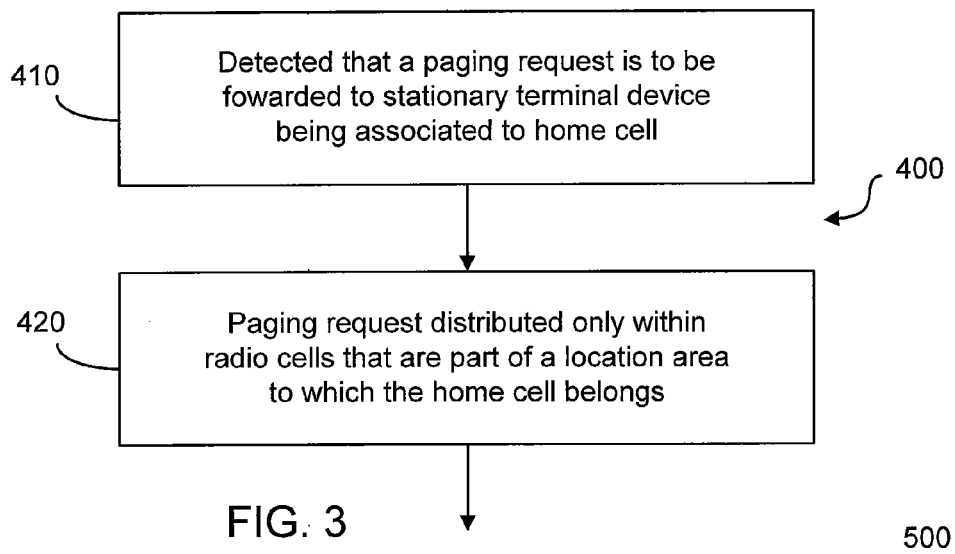
Figure 4:
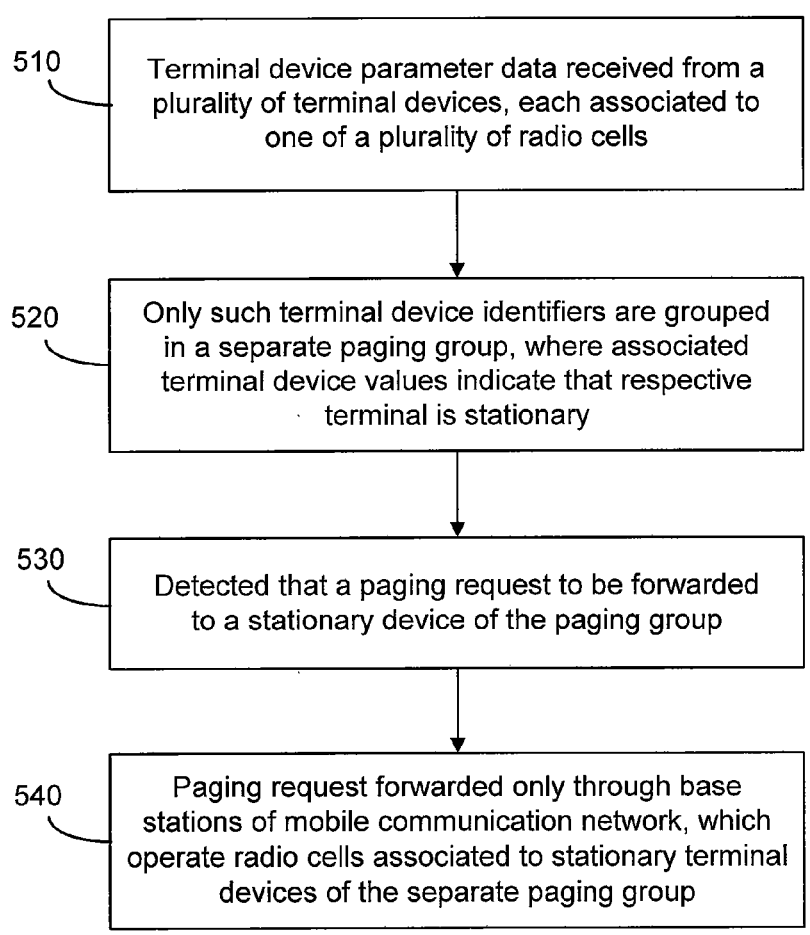

In the following drawings:

FIG. 1: shows exemplary a flow chart illustrating an embodiment of the method of the first aspect of the invention, FIG. 2: shows schematically and exemplary a representation of a stationary terminal device in accordance with the second aspect of the invention, FIG. 3: shows exemplary a flow chart illustrating of an embodiment of the method of the third aspect of the invention and FIG. 4: shows exemplary a flow chart illustrating of an embodiment of the method of the fourth aspect of the invention.

FIG. 1 illustrates a method 100 of operating a stationary terminal device adapted to participate in a mobile communication network exhibiting a plurality of radio cells.

In a first step 110, it is detected that the stationary terminal device is operated in a non-connected state. Such non-connected state can be, for instance, an IDLE mode, a cell_PCH or a URA_PCH state. In a second step 120, it is detected that a surrounding radio cell of the mobile communication network fulfils a first suitable-cell-requirement. Such suitable-cell-requirement can be any self defined requirement, for instance, a predefined offset. For instance, the second step 120 of detecting comprises measuring 122 a current radio signal strength provided by a surrounding radio cell and comparing 124 the measured radio signal strength with the predefined offset. If the measured radio signal strength is above the predefined offset, that is to say: if the suitable-cell-requirement is fulfilled, in a third step 130, the surrounding radio cell is selected as a home cell for the stationary terminal device in the non-connected state and the stationary terminal device is associated to this home cell.

In contrast to prior art cell selection methods, in a fourth step 140, the stationary terminal device remains associated to the home cell during the non-connected state, as long as the home cell fulfils a second suitable-cell-requirement.

The method 100 does not prohibit a cell change of the stationary terminal device, but rather promotes a mobile communication network initiated cell change 150 from the home cell into another radio cell, if the other radio cell offers an improved characteristic for a connected mode. For instance, if the stationary terminal device has been paged due to an incoming call, the stationary terminal device may change from the home cell to another cell during data transfer, because it will then be operated in the connected state. However, if data transfer is finished, the method 100 ensures that the stationary terminal device is preferably re-associated to the home cell.

FIG. 2 schematically shows a stationary terminal device 200 that is adapted to participate in a mobile communication network 300 exhibiting a plurality of radio cells (not shown). The depicted mobile communication network 300 illustrates a simplified architecture of a standard UTRAN with a plurality of base stations (NodeBs) being associated to a radio access network controller (RNC).

The stationary terminal device 200 is adapted to constantly sign up to a home cell during a non-connected state in order to reduce an interference caused by distribution of a paging request. The stationary terminal device 200 comprises a state detector 210 that is adapted to detect that the stationary terminal device 200 is operated in a non-connected state. It furthermore comprises a radio cell detector 220 that is adapted to detect that a surrounding radio cell (not shown) of the mobile communication network 300 fulfils a first suitable-cell-requirement for the stationary terminal device 200. For instance, the radio cell detector measures a current radio signal strength and compares the measured radio signal strength with a predefined threshold value of the radio signal strength. In this case, the first suitable-cell-requirement is fulfilled, if the radio signal strength is above the predefined threshold. Both detectors 210, 220 feed a cell selector 230 with corresponding detection signals. The cell selector 230 is adapted to select the radio cell as a home cell for the stationary terminal device 200 in the non-connected state and to associate the stationary terminal device 200 to the home cell.

The cell selector comprises a cell association unit 240 to ensure that that the stationary terminal device 200 remains associated to the home cell during the non-connected state, as long as the home cell fulfils the second suitable-cell-requirement. The cell association unit is configured to ascertain whether the selected home cell fulfils a second suitable-cell-requirement that in comparison with the first suitable-cell-requirement is biased in favour of the terminal device remaining associated with the selected home cell and against selecting another radio access network cell as the new home cell and to not initiate a change of the association the terminal device away from the selected home cell to another radio access network cell as a new home cell for as long as the selected home cell fulfils the second suitable-cell-requirement. The terminal device includes a non-transitory memory 232 to store a computer program for operating the terminal device, the computer program comprising program code for causing the terminal device to carry out method 100 when run on a computer 234. A non-transitory memory 310 also stores a computer program for operating a core network node of the mobile communication network, the computer program comprising program code for causing the node to carry out this method when run on a computer 320.

The stationary terminal device 200 can store an identifier of the home cell that is, for instance, programmed through an AT-command. The stationary terminal device 200 furthermore comprises a transmitter unit 250 that transmits the identifier of the associated home cell to an operation unit of the mobile communication network 300, for instance, to the radio access network controller RNC.

Therefore, if the mobile communication network 300 is to forward a paging request, it can check, whether the paging request is to be forwarded to the stationary terminal device 200, and, if so, transmits the paging request only via one base station (NodeB), namely via the base station that operates the home cell of the stationary terminal device 200. Therefore, the paging request must not be transmitted within the entire UTRAN, but the paging area is significantly reduced.

FIG. 3 illustrates such a paging method indicated above. The paging method 400 is a method of paging a stationary terminal device that is operated with an operating method according to the first aspect of the invention. Such a stationary terminal device can be, for instance, the terminal device 200, while it is operated as a stationary terminal. In a first step 410, it is detected that a paging request is to be forwarded to the stationary terminal device being associated to the home cell.

In the second step 420, the paging request is distributed only within radio cells that are part of a location area and/or respectively of a UTRAN registration area, to which the home cell belongs. Thus, the paging interference and electricity consumption both on the side of the terminal device and on the side of the base stations is significantly reduced.

FIG. 4 illustrates a method 500 according to the fourth aspect of the present invention. The method 500 is a method of operating a mobile communication network exhibiting a plurality of radio cells. In the first step 510, terminal device parameter data is received from a plurality of terminal devices, each being associated to one of the plurality of radio cells. The respective user parameter data comprises a terminal device identifier and a terminal device value. The terminal device value indicates whether the respective terminal device is stationary or free-to-move.

In the second step 520, only such terminal device identifiers are grouped in a separate paging group, whose associated terminal device values indicate that a respective terminal device is stationary.

In a third step 530, it is detected that a paging request is to be forwarded to a stationary terminal device of the paging group and in a fourth step 540, a paging request is forwarded only through such base stations of the mobile communication network, which operate radio cells being associated to the stationary terminal devices of the separate paging group.

The respective terminal device identifier can be an international mobile subscriber identity. The step of receiving terminal device parameter data can additionally comprise a step of accessing a home location register that stores at least such terminal device identifiers.

Also according to the method 500 of the fourth aspect of the present invention, the paging interference and the electricity consumption, both on the side of the terminal device participating in the mobile communication network and on the side of the base stations, is significantly reduced. A non-transitory memory 310 stores a computer program for operating a core network node of the mobile communication network, the computer program comprising program code for causing the node to carry out the method of FIG. 4 when run on computer 320.

Summarizing, the present invention relates to distinguishing between stationary and free-to-move terminal device in a mobile communication network in order to reduce paging interference. According to one aspect of the present invention, a stationary terminal device chooses a surrounding radio cell as a home cell, which remains associated to the stationary terminal device, as long as the home cell fulfils a suitable-cell-requirement. Therefore, the communication network can be operated such that a paging request is only distributed through one base station/NodeB, if that paging request is to be forwarded to a stationary terminal device being associated to a home cell. According to another aspect of the present invention, stationary terminal devices are grouped in a separate paging group that is stored in an operation unit of the mobile communication network. If a paging request is to be distributed, it is firstly checked, whether the paging request is to be forwarded to one of the terminal devices of the separate paging group. If so, the paging request is only distributed through base stations (NodeBs), which operate radio cells to which the terminal devices of the separate paging group are associated. Therefore, according to both aspects of the present invention, the paging interference is reduced since the paging area is significantly reduced. Therefore, terminal devices participating in the mobile communication network have to decode fewer paging frames.

The invention claimed is:

1. A method for operating a stationary terminal device in a cellular mobile communication network that has a plurality of radio access network cells, the method comprising:
   the terminal device detecting that it is being or is about to be operated in a non-connected state,
   the terminal device detecting whether or not at least one radio access network cell of a mobile communication network fulfils a first suitable-cell-requirement,
   the terminal device selecting one of those radio access network cells that fulfil a first suitable-cell-requirement as a home cell for operation of the terminal device as a stationary terminal device in the non-connected state and associating the terminal device to the home cell while operated as stationary terminal device by signal exchange with a base station allocated to the home cell,
   the terminal device subsequently detecting whether or not the selected home cell fulfils a second suitable-cell-requirement that in comparison with the first suitable-cell-requirement is biased in favour of the terminal device remaining associated with the selected home cell and against selecting another radio access network cell as the new home cell; and
   the terminal device not initiating a change from the selected home cell to another radio access network cell as a new home cell during the non-connected state for as long as during the non-connected state the selected home cell fulfils the second suitable-cell requirement.

2. The method according to claim 1, additionally comprising:
   the terminal changing to a connected state
   the terminal performing a change of association from the previously selected home cell to a radio access network cell different from the home cell by signal exchange with another base station allocated to the different radio access network cell;
   the terminal returning to the non-connected state
   the terminal device subsequently initiating a process of re-associating the terminal device back to the previously selected home cell.

3. The method according to one of the preceding claims, additionally comprising:
   the terminal device storing an identifier of the home cell in a memory of the terminal device, in particular by means of an AT-command.

4. The method according to claim 1 or claim 2, wherein not initiating a change from the selected home cell to another radio access network cell as a new home cell during the non-connected state comprises:
   the terminal device repeating the ascertainment of fulfilment of the second suitable-cell-requirement for the currently selected home cell;
   the terminal device initiating a selection of another radio access network cell as the home cell only upon detection that the currently selected home cell does not fulfil the second suitable-cell-requirement anymore.

5. The method according to claim 1 or claim 2, further comprising:
   the terminal device periodically detecting for a reception of a paging request directed to the terminal device from the base station of the home cell, wherein a first time interval between the periodic detections is longer than a second time interval between periodic detections for receptions of a paging request, which are performed by any non-stationary terminal device associated with the same radio access network cell that is forming the home cell for the stationary terminal device.

6. A computer program stored in a non-transitory memory for operating a terminal device, the computer program comprising program code means for causing the terminal device to carry out a method as defined in claim 1, when the computer program is run on a computer controlling the terminal device.

7. A terminal device for communication via a radio access network cell of a cellular mobile communication network, the terminal device comprising:
   a device parameter unit for storing a device parameter allocated to the terminal device and having one of exactly two possible device parameter values indicative of whether or not the terminal device is being operated either as a stationary terminal device or as a non-stationary terminal device,
   a state detector adapted to detect that the terminal device is operated in a non-connected state,
   a radio cell detector adapted to detect whether or not at least one radio access network cell of a cellular mobile communication network fulfils a first suitable-cell-requirement,
   a cell selector, which is connected with the radio cell detector and which is configured to select one radio access network cell that fulfils the first suitable-cell-requirement as a home cell for operation as a stationary terminal device in the non-connected state and to initiate a signal exchange of the terminal device with a base station allocated to the home cell for association of the terminal device to the home cell while operated as stationary terminal device, wherein the cell selector is configured to ascertain whether the selected home cell fulfils a second suitable-cell-requirement that in comparison with the first suitable-cell-requirement is biased in favour of the terminal device remaining associated with the selected home cell and against selecting another radio access network cell as the new home cell and to not initiate a change of the association the terminal device away from the selected home cell to another radio access network cell as a new home cell for as long as the selected home cell fulfils the second suitable-cell-requirement.

8. The terminal device of claim 7, wherein the terminal device is configured to periodically perform a paging detection for a reception of a paging request directed to the terminal device from the base station of the home cell, and wherein a first time period between two consecutive paging detections is longer than a second time interval between periodic paging detections, which are performed by any non-stationary terminal device associated with the same radio access network cell that is forming the home cell for the stationary terminal device.

* * * * *